May 20, 1941.  G. RAYMOND  2,242,547
SAFETY PRESSURE DEVICE
Original Filed June 17, 1935   2 Sheets-Sheet 1

INVENTOR
Gwynne Raymond
BY
ATTORNEY

May 20, 1941.  G. RAYMOND  2,242,547

SAFETY PRESSURE DEVICE

Original Filed June 17, 1935   2 Sheets-Sheet 2

INVENTOR
Gwynne Raymond
BY
ATTORNEY

Patented May 20, 1941

2,242,547

UNITED STATES PATENT OFFICE 2,242,547

SAFETY PRESSURE DEVICE

Gwynne Raymond, Oklahoma City, Okla.

Original application June 17, 1935, Serial No. 27,134. Divided and this application March 2, 1938, Serial No. 193,458

3 Claims. (Cl. 220—89)

This invention relates to safety pressure devices of the frangible diaphragm type for use in connection with fluid systems wherein the contained pressures differ greatly from the external pressures, and is a division of my copending application Serial No. 27,134, filed June 17, 1935, which matured into Patent No. 2,123,662, issued July 12, 1938.

The principal object of the present invention is to provide a relief safety mechanism equipped with dual diaphragms that are respectively actuated at excessively high and low pressure differentials.

Other important objects of the invention are to provide improved means for anchoring the diaphragms; and to provide sustaining means within the high pressure sides of the respective diaphragms.

In accomplishing these and other objects of the invention, I have provided improved details of structure, the preferred forms of which are illustrated in the accompanying drawings, wherein.

Figure 1:
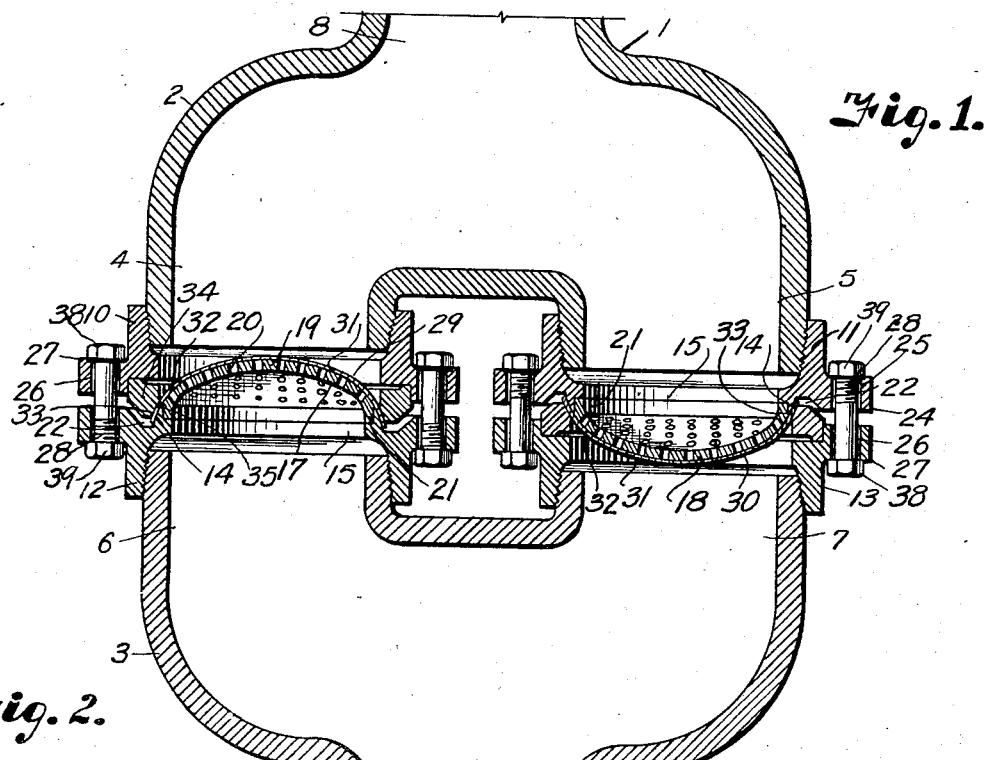
Fig. 1 is a section through a safety device for use in connection with systems subject to critical reverse pressures and showing dual diaphragms respectively arranged to fracture when the pressures acting thereon reach predetermined maximum and minimum values.
Figure 2:
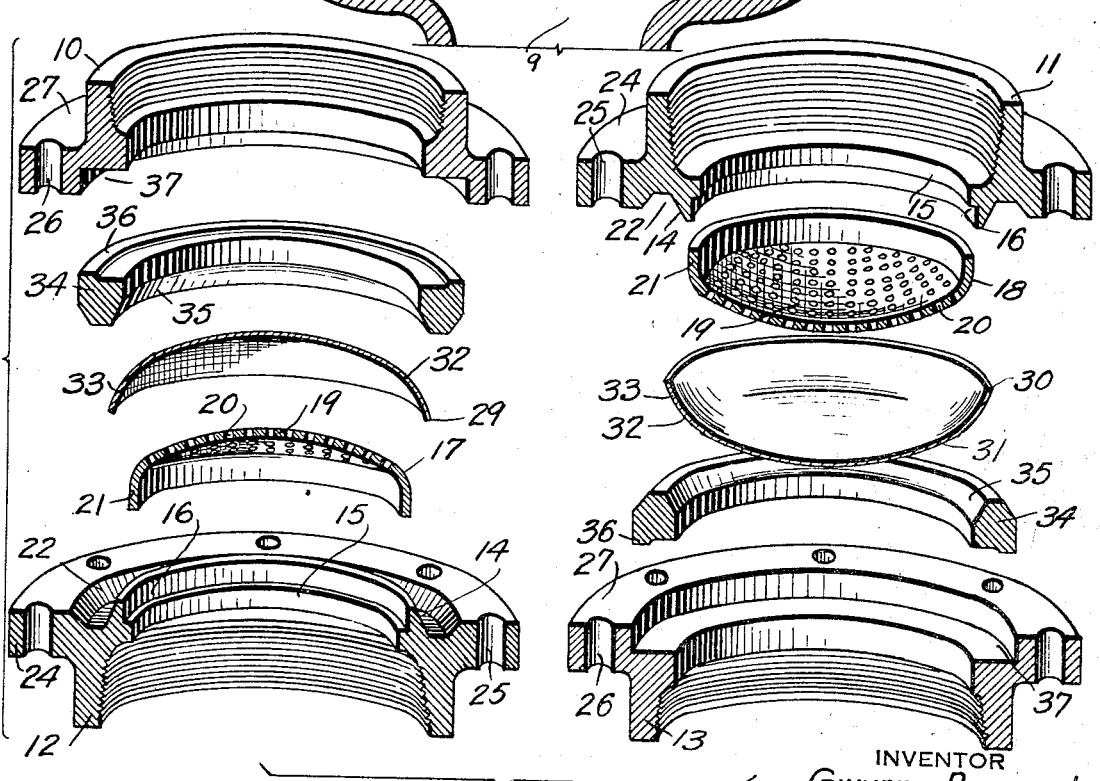
Fig. 2 is a perspective sectional view of the diaphragms and their retaining members shown in disassembled spaced relation.

Referring more in detail to the drawings:

1 designates a safety device embodying the features of the present invention, and which includes a pair of oppositely arranged, substantially U-shaped fittings 2 and 3, having registering branches 4—5 and 6—7 respectively connected with passageways 8 and 9 leading to parts of a pressure system carrying differential pressures. The branches 4—5 and 6—7 have external threads for threadedly attaching collars 10—11 and 12—13 by which the fittings are connected together. The collars 12 and 11 have annular diaphragm seating faces 14, inclined inwardly in encircling relation with flow openings 15 that substantially conform in diameter to the inner diameter of the respective branches.

Figure 3:
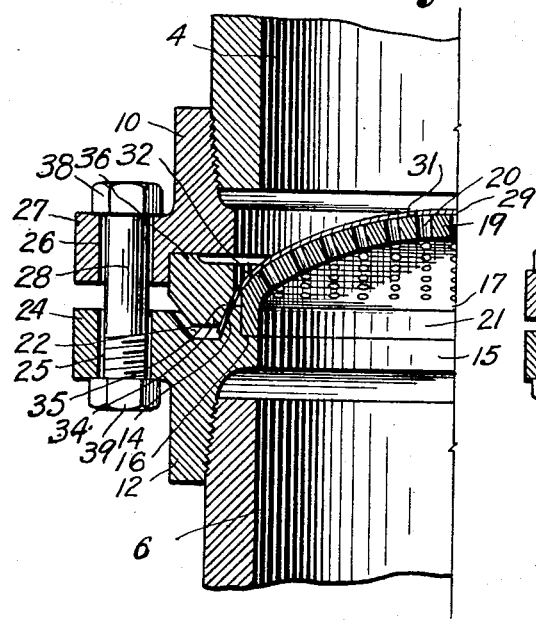
Fig. 3 is an enlarged section through one side of one of the diaphragms and its clamping members, shown in assembled relation.

The flow openings 15 are circumscribed with inset shoulders 16 for seating diaphragm sustaining members 17 and 18 respectively. The diaphragm sustaining members 17 and 18 include dome-shaped portions 19 covering the openings 15 and having a plurality of perforations 20 to establish communication between the respective U-shaped fittings 2 and 3 upon bursting of the diaphragms, as later described. The dome portions of the supporting members are of substantially semi-elliptical cross-section and have annular flanges 21 seating snugly within the inset shoulders 16, so that the inclined diaphragm seating faces 14 extend substantially tangential to the circumferential surfaces of the supporting members, as clearly shown in Fig. 3.

Formed in the collars 11 and 12, in encircling relation with the inclined seating portions 14, are annular recesses 22. The collars 11 and 12 also have laterally extending flanges 24, provided with a series of openings 25 cooperating with similar openings 26 in flanges 27 of the collars 10 and 13 for accommodating fastening devices 28 by which the fittings are secured together, as later described.

Seated upon the annularly inclined seating or gripping portions 14 are safety diaphragms 29 and 30 that normally close the respective openings 15, but which are adapted to fracture under predetermined pressures. These diaphragms are formed of material that may be shaped to a dome of uniform thickness and capable of fracture under predetermined pressures acting against their concave sides. The dome portions 31 of the diaphragms terminate at their peripheries by smoothly rounded annular bends 32 in outwardly flaring flanges 33 of suitable diameter and shape to fit snugly over the seating portions 14, as clearly shown in Fig. 4, so that there are no sharp break lines on which the diaphragms will tend to fracture. The domes 31 of the diaphragms are substantially semi-elliptical in cross-section to constitute the frangible portions of the diaphragms and are capable of first failing at their centers and then splitting in radial directions toward their peripheries in the manner of an orange peel, whenever predetermined calculated pressures are reached on the concave sides thereof. The diaphragms may be constructed to disrupt within very close limits of the predetermined pressures for any diameter of dome by providing material of the proper thickness, the tensile strength of the material being considered. The diaphragms thus described correspond in shape with and seat snugly over the perforated supporting members so that they are supported against collapse by pressures acting on the concave sides thereof.

Seated over the outer faces of the diaphragm flanges 33 are retaining rings 34 provided with inclined inner gripping faces 35 complementary to the seating or gripping faces 14. The inner diameters of the rings are preferably such as to pass freely over the rounded peripheries of the diaphragms and the faces thereof opposite the gripping portions have annular ribs 36 engaging in annular recesses 37 of the collars 10 and 13.

The fastening devices 28 are shown as bolts arranged so that the heads 38 engage against the flanges 27 and the nuts 39 engage under the flanges 24 to draw the collars together and the clamping rings into gripping relation with the annular flanges of the respective diaphragms. The flanges of the diaphragms are thus wedged tightly against the seating faces to retain normal pressures on the respective sides of the diaphragms.

While I have described the collars as being secured together by bolts, it is obvious they may be fastened together by other means without departing from the spirit of the invention.

Assuming that a safety device constructed as described is connected into a pressure system having differential pressures, and assuming that the pressure within the fitting 2 should rise above the pressure in the fitting 3, the diaphragm 30 will fracture when the pressure differential reaches the point for which the diaphragm 30 was designed to fracture, thereby relieving the excessive pressure differentials which might be destructive to the system with which the safety device is associated. Likewise, should the pressure in the fitting 3 rise dangerously above the pressure in the fitting 2, the diaphragm 29 will fracture to relieve the excessive pressure differentials.

When the diaphragms begin to fracture they will first yield in their centers and split radially toward the peripheries thereof to provide a substantially full opening of the passages 15. It is pointed out that the functioning pressures acting on the respective diaphragms need not be the same, for example, it may be desirable to have the diaphragm 30 designed to burst under fluid pressure of twenty pounds per square inch acting on the concave side thereof, whereas the diaphragm 29 may be designed to burst under a fluid pressure of two hundred pounds per square inch acting on its concave side.

Figure 4:
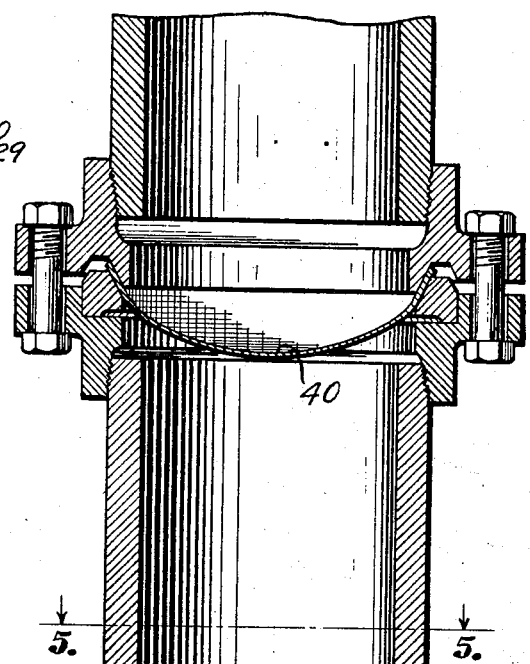
Fig. 4 is a section through a modified form of the invention.
Figure 5:
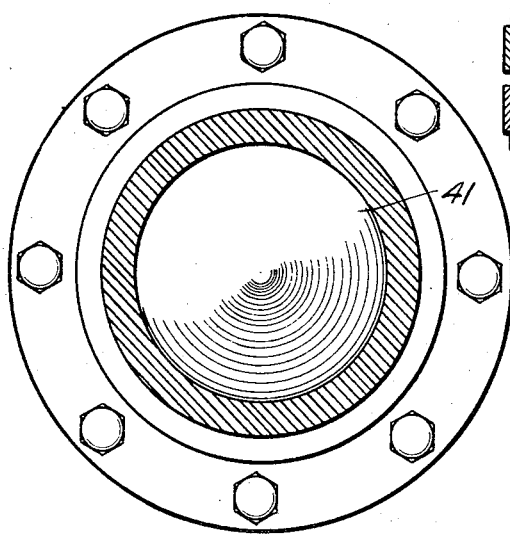
Fig. 5 is a cross-section on the line 5—5 of Fig. 4.

Figs. 4 and 5 illustrate a modified form of the invention where the diaphragms 40 and 41 are arranged in series or tandem in reverse relation to each other. For example, the diaphragm 40 is positioned with the dome portion thereof facing in one direction while the dome portion of the diaphragm 41 extends in the opposite direction so that the differential pressures act against their concave sides. Thus a pressure which will blow out the diaphragm 41 will readily reverse and destroy the diaphragm 40, and vice versa. In this instance the perforated diaphragm supporting members are omitted, otherwise the diaphragm clamping parts of the safety devices are identical to those illustrated in the first form of the invention.

From the foregoing it is obvious that the safety devices constructed as described will function and blow out very close to the calculated pressure differentials for which they are designed, so that the system may operate at its safe differential working pressures without danger of the diaphragms giving way, but should safe pressure differentials be exceeded, one or the other of the diaphragms will operate to relieve the pressure on the high pressure side before the bursting pressure in the system is reached. The diaphragms also have ample fatigue resistance and are capable of operating at ordinary working pressure differentials over a long period of time. This is particularly true when the inner supporting members are used, because the diaphragms are positively sustained against fatigue.

What I claim and desire to secure by Letters Patent is:

1. A safety device including diaphragm supporting means comprising a pair of fittings having spaced aligning branches, reversely arranged dome-shaped frangible diaphragms clamped between the branches of the respective fittings, said diaphragms having different predetermined blowout pressures in one direction, and means for supporting the diaphragms to prevent bursting of the diaphragms in the other direction.

2. A safety device including diaphragm supporting means comprising a pair of fittings having spaced aligning branches, reversely arranged dome-shaped frangible diaphragms having rims between the branches of the respective fittings, and means connecting said fittings to maintain positive leak-proof seals about the peripheries of said diaphragms.

3. A safety device including diaphragms supporting means comprising a pair of fittings having spaced aligning branches, reversely arranged dome-shaped frangible diaphragms having rims between the branches of the respective fittings, and means connecting said fittings to maintain positive leak-proof seals about the peripheries of said diaphragms, said diaphragms having predetermined blowout pressures when said predetermined pressures act on the concave sides of said diaphragms.

GWYNNE RAYMOND.